(12) United States Patent
Inukai (10) Patent No.: US 7,693,010 B2
(45) Date of Patent: Apr. 6, 2010

(54) OPTICAL BEAM CONTROL DEVICE AND IMAGE-FORMING DEVICE INCLUDING THE SAME

(75) Inventor: Katsumi Inukai, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1378 days.

(21) Appl. No.: 11/090,237

(22) Filed: Mar. 28, 2005

(65) Prior Publication Data

US 2005/0219990 A1 Oct. 6, 2005

(30) Foreign Application Priority Data

Mar. 30, 2004 (JP) ............... 2004-099706

(51) Int. Cl.
*G11B 11/00* (2006.01)

(52) U.S. Cl. ................ 369/13.26; 345/418

(58) Field of Classification Search ............ None
See application file for complete search history.

(56) References Cited

U.S. PATENT DOCUMENTS

| 4,663,760 | A | | 5/1987 | Shimada et al. | |
|---|---|---|---|---|---|
| 5,043,745 | A | | 8/1991 | Inoue et al. | |
| 6,055,083 | A | * | 4/2000 | Eom | 359/203 |
| 6,636,190 | B2 | * | 10/2003 | Hirakata et al. | 345/74.1 |
| 2006/0094986 | A1 | * | 5/2006 | Neel et al. | 600/583 |

FOREIGN PATENT DOCUMENTS

| JP | A-58-127957 | | 7/1983 |
|---|---|---|---|
| JP | A-61-175656 | | 8/1986 |
| JP | A-63-305370 | | 12/1988 |
| JP | 02-96786 | | 4/1990 |
| JP | A-3-134683 | | 6/1991 |
| JP | 09240052 A | * | 9/1997 |
| JP | 11281134 A | * | 10/1999 |

* cited by examiner

*Primary Examiner*—Joseph H Feild
*Assistant Examiner*—Parul Gupta
(74) *Attorney, Agent, or Firm*—Oliff & Berridge, PLC (57) ABSTRACT

An optical beam control device that can suppress deterioration of a laser diode and a photosensitive member is disclosed. Control is performed in such a manner that the luminous energy of emitted light is increased gradually in an initial period from the activation of a laser diode until the first generation of a BD detection signal. The initial period includes an extinction period in which the laser beam is extinguished. Therefore, deterioration of the light-emitting portion of the laser diode and the photosensitive member can be suppressed.

12 Claims, 7 Drawing Sheets

OPTICAL BEAM CONTROL DEVICE AND IMAGE-FORMING DEVICE INCLUDING THE SAME

BACKGROUND OF THE INVENTION

1. Field of the Invention

The present invention relates to an optical beam control device, in particular, to an optical beam control device that controls an optical beam used to expose an image bearing member such as a photosensitive member in an image-forming device, and to an image-forming device including the same.

2. Description of Prior Art

In an electrophotographic type of image-forming device, an optical beam is emitted by an optical beam emission device such as a laser diode, and the thus-emitted optical beam is deflected by optical components such as a polygon mirror. The optical beam then forms a latent electrostatic image by scanning the surface of a photosensitive member that has been uniformly charged. Therefore, an image is formed on a recording sheet through processing such as development and transfer.

The method for controlling the luminous energy of the optical beam is an auto power control (APC) method that involves using a luminous energy detection sensor to detect the luminous energy of the emitted light, such as a PIN-type photodiode, and then controlling the drive of the laser diode in response to the detected luminous energy. However, a problem arises in that, if a large amount of current starts flowing into the laser diode immediately after the activation of the laser diode, variations in the characteristics of the laser may result in exceeding the rated value, which may lead to destruction of the laser diode, as described in Japanese unexamined patent publication 2-96786.

In addition, the control over the optical beam relates to the timing of the light emission as well as to the luminous energy as described above. Control of the light-emission timing involves the use of an optical beam detection sensor (BD sensor) that is provided at the position that the optical beam passes at a timing just before a scan of the surface of the photosensitive member. In other words, the control is performed in order that the timing at which the optical beam passes the BD sensor is detected, and the optical beam then exposes a proper position on the surface of the photosensitive member, based on an output signal of the BD sensor (BD detection signal).

Japanese unexamined patent publication 2-96786 discloses a luminous energy control device that controls the luminous energy so as to increase gradually from the activation of the laser diode, thereby preventing destruction of the components such as the laser diode. In addition, the laser diode is controlled to emit light only at a timing at which the surface of the photosensitive member is not directly exposed, after the optical beam has reached a predetermined amount of luminous energy at which the BD sensor can detect the optical beam.

However, the above-described control device has problems concerning deterioration of the laser diode and deterioration of the surface of the photosensitive member scanned by the optical beam, since the laser diode always emits a light beam until the BD sensor detects the optical beam.

In order to solve the above problems, an main object of the present invention is to provides an optical beam control device that can suppress deterioration of the laser diode and photosensitive member, and an image-forming device that uses the optical beam control device.

SUMMARY OF THE INVENTION

The present invention provides an optical beam control device having: a light-emission unit, a scanning unit, a luminous energy detection unit, an optical beam detection unit, and a control unit. The light-emission unit emits an optical beam. The scanning unit causes the optical beam to scan on an image bearing member. The luminous energy detection unit detects luminous energy of the optical beam emitted by the light-emission unit. The optical beam detection unit detects that the optical beam having a predetermined amount of luminous energy scans on a predetermined position. The control unit controls a light-emission timing at which the light-emission unit emits the optical beam. The control unit controls the luminous energy of the optical beam emitted by the beam emission unit in response to the detected luminous energy. The control unit increases the luminous energy gradually in an initial period from an activation of the light-emission unit to a first detection of the optical beam by the optical beam detection unit. The initial period has an extinction period. The control unit controls the light-emission unit to extinguish the optical beam during the extinction period.

The present invention provides an image-forming device having: a light-emission unit, an image bearing member, a scanning unit, a luminous energy detection unit, an optical beam detection unit, and a control unit. The light-emission unit emits an optical beam. The image bearing member is exposed by the optical beam to form a latent image thereon. The scanning unit causes the optical beam to scan on the image bearing member. The luminous energy detection unit detects luminous energy of the optical beam emitted by the light-emission unit. The optical beam detection unit detects that the optical beam having a predetermined amount of luminous energy scans on a predetermined position. The control unit controls a light-emission timing at which the light-emission unit emits the optical beam. The control unit controls the luminous energy of the optical beam emitted by the beam emission unit in response to the detected luminous energy. The control unit increases the luminous energy gradually in an initial period from an activation of the light-emission unit to a first detection of the optical beam by the optical beam detection unit. The initial period has an extinction period. The control unit controls the light-emission unit to extinguish the optical beam during the extinction period.

BRIEF DESCRIPTION OF THE DRAWINGS

The aforementioned aspects and other features of the invention are explained in the following description, taken in connection with the accompanying drawing figures wherein.

DETAILED DESCRIPTION OF THE PREFERRED EMBODIMENTS

The present invention is described below with reference to the accompanying figures. It should be noted that the expressions "front", "rear", "above" and "below" are used throughout the description to define the various parts when a laser printer is disposed in an orientation in which it is intended to be used.

(1) Overall Configuration of Laser Printer

Figure 1:
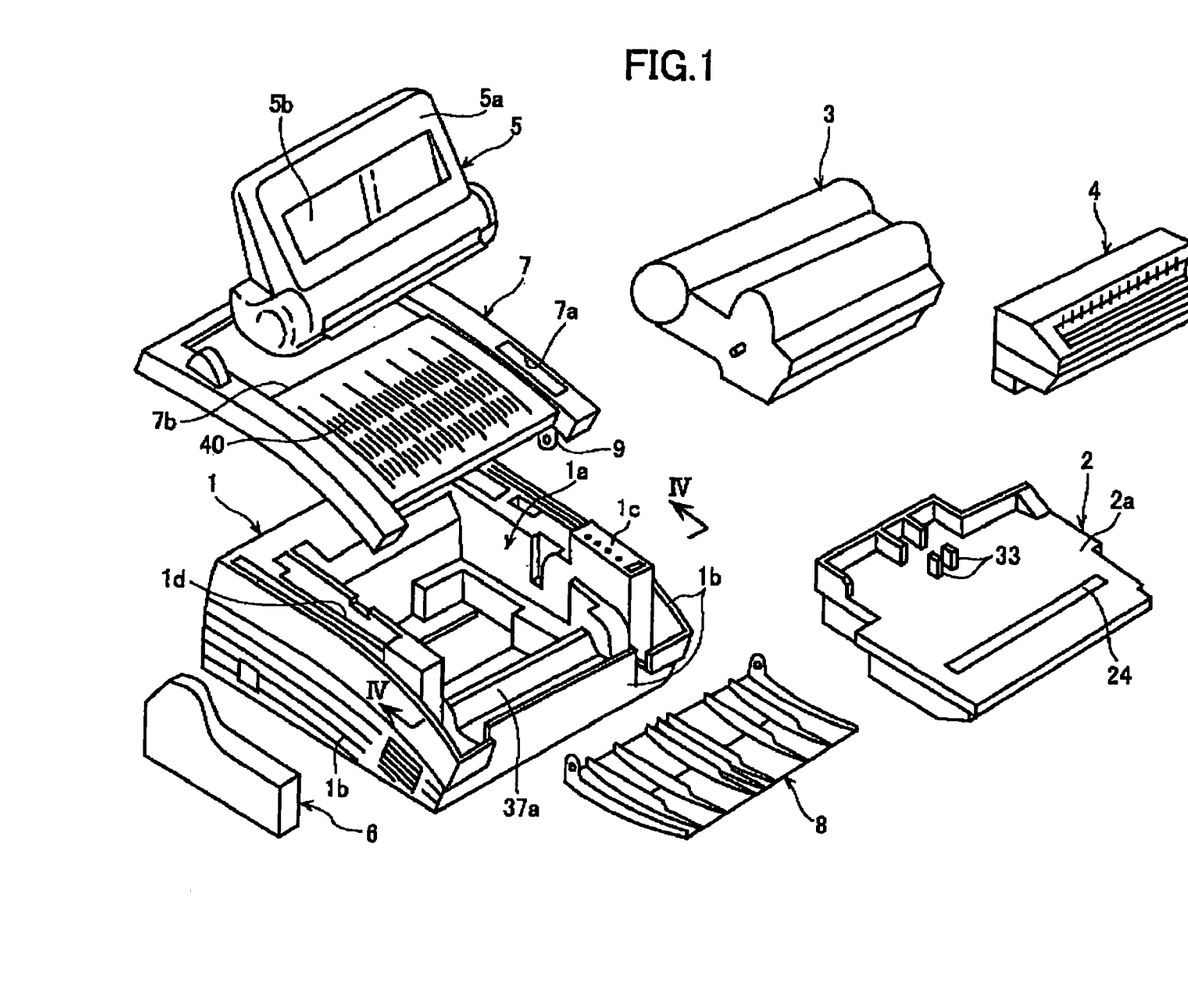
FIG. 1 is a perspective exploded view showing a laser printer according to the present invention.

Referring to FIG. 1, a laser printer includes a scanner unit 2, a process unit 3, a fixing unit 4, a paper supply unit 5, and a drive train unit 6, which are accommodated within a main frame 1a of a main casing 1. The laser printer 100 is also provided with an optical beam controller (not shown) that controls light emission of the scanner unit 2 and a main controller (not shown) that controls the optical beam controller and the above-mentioned units.

The main casing 1, which is made of plastic, has the main frame 1a and a main cover 1b that covers the outer surfaces on four sides (the front, rear, and left and right sides) of the main frame 1a, and the main frame 1a and the main cover 1b are formed integrally by molding.

The drive train unit 6 includes a main motor (not shown) and a gear train as shown in FIG. 1. The drive train unit 6 is inserted from the lower side of the main casing 1 into an accommodation recess 1d provided between the inner surface on the left side of the main cover 1b and the left side of the main frame 1a, thereby being firmly attached with the main casing 1. A top cover 7 acts as a plastic main cover for covering the upper surfaces of the main frame 1a and the main cover 1b. The top cover 7 is pierced by holes 7a and 7b. An operating panel 1c that protrudes upward from the right side of the main frame 1a is fitted in the hole 7a. A base portion of the paper supply unit 5 is fitted in the hole 7b.

A base portion of a paper delivery tray 8 is mounted on brackets 9 that protrude from the left and right sides of the front edge of the top cover 7 (just one bracket 9 is shown in FIG. 1). When the printer is not in use, the paper delivery tray 8 can be folded up toward the upper surface of the top cover 7.

Figure 2:
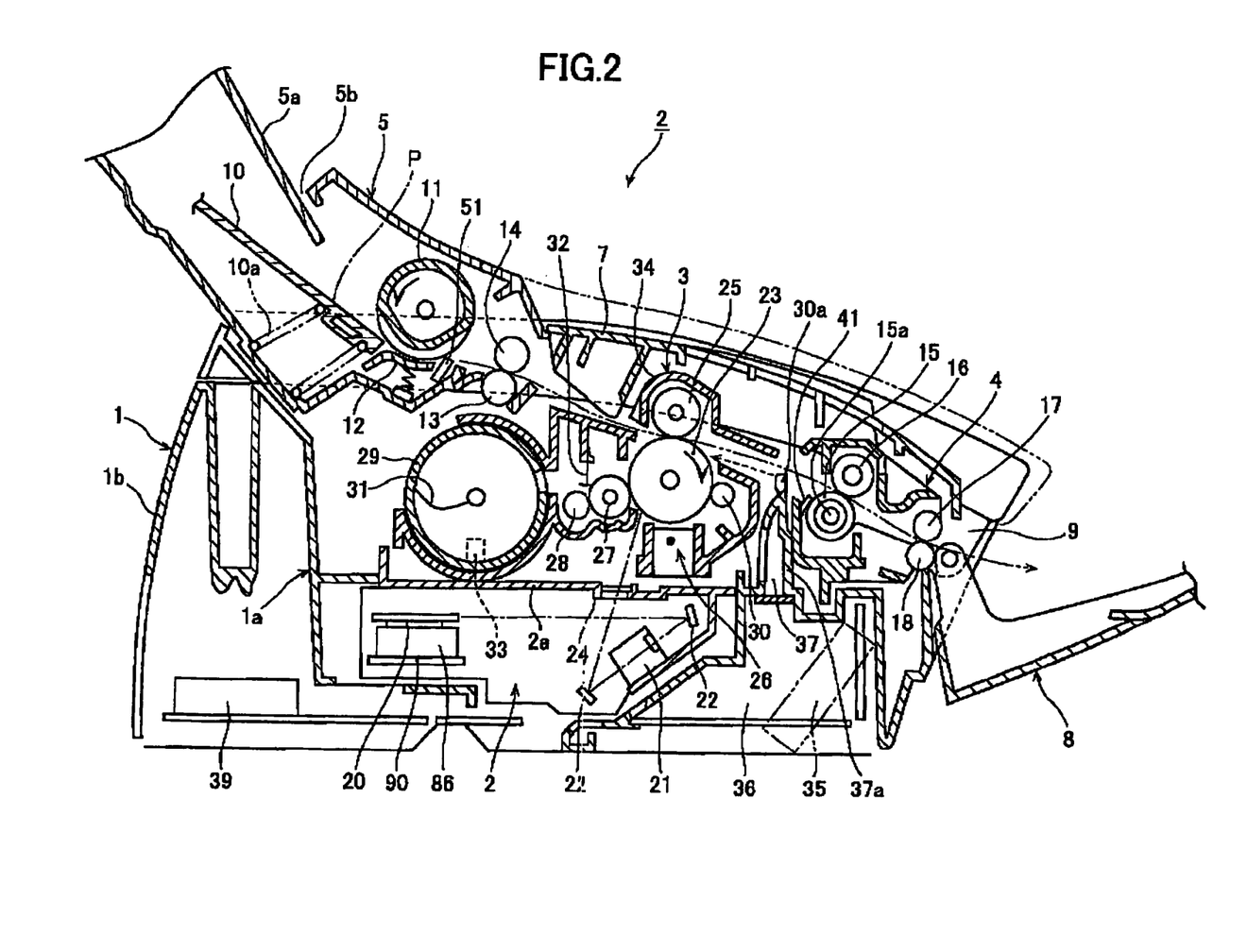
FIG. 2 is a schematic section showing the laser printer.

Recording paper P is set within a feeder case 5a of the paper supply unit 5 in a stacked state. As shown in FIG. 2, the leading edge side of the recording paper is pressed towards a paper supply roller 11 by a support plate 10 attached by a spring 10a within the feeder case 5a, so that sheets of the recording paper P can be separated one at a time by a separation pad 12 and the paper supply roller 11 that is rotating due to the power transmitted from the drive train unit 6. The sheet is then sent onto a pair of upper and lower registration rollers 13 and 14. Note that a manual insertion opening 5b that opens diagonally upward is provided in the paper supply unit 5 in order to insert that recording paper into the manual insertion opening 5b, thereby enabling printing with recording paper that is different from the recording paper P within the feeder case 5a.

The process unit 3 forms an image (toner image) by a developer (toner) on the surface of the recording paper P that is sent through the registration rollers 13 and 14. The fixing unit 4 heats the recording paper P having the toner image by sandwiching the paper P between a heating roller 15 and a pressure roller 16, thereby fixing the toner image onto the recording paper P. Note that the heating roller 15 has a fixing heater inserted into an aluminum tube coated with fluoride. And a thermistor 41 is in contact with the outer surface of the heating roller 15 at a substantially central portion in the longitudinal direction. The pressure roller 16 is made from rubber and has a surface covered with a fluoroplastic.

A paper delivery portion includes a paper delivery roller 17 and a pinch roller 16 which are disposed on the downstream side within the casing of the fixing unit 4. The paper delivery portion delivers the recording paper P having the fixed toner image to the paper delivery tray 8.

An upper support plate 2a of the scanner unit 2 is fixed by means of screws to stays that are formed integrally with the upper surface of the base plate of the main frame 1a, so that the upper support plate 2a is located below the process unit 3 disposed in a substantially central portion of the main frame 1a.

The scanner unit 2 includes a light-emitting unit (not shown in FIG. 1), a polygon mirror 20, an fθ lens 21, and a reflective mirror 22, which are positioned on the lower surface side of the plastic upper support plate 2a. The polygon mirror 20 is rotated at high speed by a scanner motor 86 driven by a motor drive circuit 90. The laser beam deflected by the polygon mirror 20 passes through a glass plate 24 that covers a long, narrow scanner hole, which is pierced through the upper support plate 2a, extending along the axial line of the photosensitive drum 23. The laser beam then exposes the outer peripheral surface of the photosensitive drum 23.

The process unit 3 includes the photosensitive drum 23 and a transfer roller 25 in contact with the upper surface thereof: a scorotron type of charger 26 disposed below the photosensitive drum 23; a developer device having a developer roller 27 and a supply roller 28 disposed on the upstream side of the photosensitive drum 23 in the paper supply direction; a developer (toner) supplier, in other words, a removable toner cartridge 29 disposed further upstream thereof; a cleaning roller 30 disposed downstream from the photosensitive drum 23, and a charge removal lamp 30a disposed further downstream from the cleaning roller 30.

A latent electrostatic image is formed on the outer peripheral surface of the photosensitive drum 23 by scanning the laser beam emitted from the scanner unit 2 over the surface of the photosensitive member that has been charge uniformly by the charger 26. After the developer (toner) within the toner cartridge 29 has been agitated and discharged by an agitator 31, the developer is carried on the outer peripheral surface of the developer roller 27 via the supply roller 28. The thickness of the toner layer thereon is regulated by a blade 32.

The latent electrostatic image formed on the surface of the photosensitive drum 23 is turned into an actual image by the adhesion of developer from the developer roller 27. The image (toner image) formed by the developer is transferred to the recording paper P that passes between the photosensitive drum 23 and the transfer roller 25 to which is applied a transfer bias of a potential opposite to that of the photosensitive drum 23. After the toner remaining on the photosensitive drum 23 has been recovered temporarily by the cleaning roller 30, the toner is returned to the photosensitive drum 23 at a predetermined timing, and is recovered back into the process unit 3 by the developer roller 27.

Note that a toner sensor 33 is provided to protrude upward from the upper support plate 2a of the scanner unit 2. The toner sensor 33 consisting of a paired light-emitting portion and light-receiving portion faces into a recess in the lower portion of the toner cartridge 29 in the process unit 3 so that the toner sensor 33 detects the presence or absence of toner within the toner cartridge 29.

The process unit 3 is formed as a cartridge that is inserted into a plastic case 34, so that the cartridge type of process unit 3 can be mounted removably in the main frame 1a. An accommodation portion 36 accommodating a cooling fan 35 and a ventilation duct 37 extending in the lateral direction crossing the direction of travel of the recording paper P are in communication with each other on a lower surface side linking a front portion of the main frame 1a and a front portion of the main cover 1b. An upper surface plate 37a of the ventilation duct 37 is formed to have an inverted V-shape in section. The upper surface plate 37a is positioned between the process unit 3 and the fixing unit 4 to shield the process unit 3 from direct transmission of heat emitted from the heating roller 15 in the fixing unit 4.

The cooling flow generated by the cooling fan 35 passes through the ventilation duct 37, and along the lower surface of the main frame 1a to cool a power source 39 at the rear and the main motor within the drive train unit 6 on the one hand. The cooling flow is blown out from a plurality of slits formed on the process unit 3. The cooling flow then passes upward between the process unit 3 and the fixing unit 4 to be exhausted outside from a plurality of exhaust holes 40 that pierce through the top cover 7.

(2) Configuration of Laser Optical System

Figure 3:
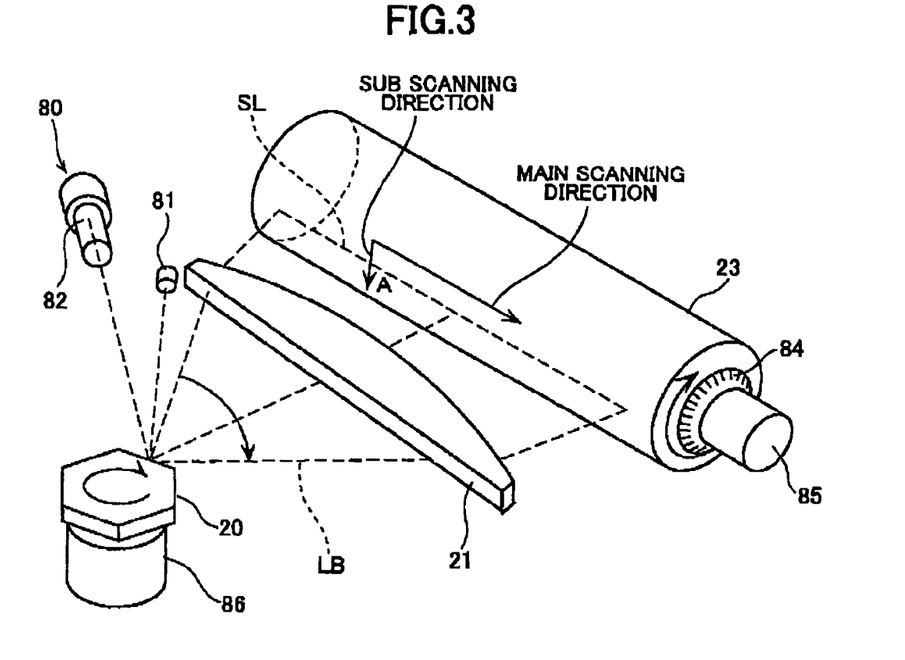
FIG. 3 is a perspective view showing the laser optical system.

FIG. 3 shows a laser optical system that generates a laser beam LB to scan and expose the surface of the photosensitive drum 23. The laser optical system includes a light-emitting unit 80 provided with a laser diode 82, the polygon mirror 20, and the fθ lens 21. The laser beam LB emitted by the laser diode 82 is modulated by an image signal (VDO) that will be described later. The laser beam LB is then projected onto the polygon mirror 20 through a collimator lens and cylindrical lens (not shown). The polygon mirror 20 is driven by a polygon mirror drive motor 86 to rotate at high speed in the direction of the arrow, thereby deflecting the laser beam LB into an equiangular speed motion. The laser beam LB performing the equiangular speed motion is emitted so as to pass through the fθ lens 21 and move at uniform speed in a main scanning direction over the photosensitive drum 23. Thus, a scan line SL as shown on the photosensitive drum 23 is formed on the photosensitive drum 23 to expose the same.

A beam detection sensor (designated as BD sensor hereinafter) 81 receives the laser beam LB immediately before the laser beam LB starts scanning the photosensitive drum 23. The BD sensor 81 then transmits a main scan start signal (designated as BD detection signal hereinafter) to the controller (not shown). The controller receives the BD detection signal and drives a stepping motor 85 that is an actuator to rotate the photosensitive drum 23 in synchronization with the timing of the main scan. The photosensitive member to be exposed is moved in the direction of the arrow A by the rotation of the photosensitive drum 23. The photosensitive substance provided on the surface of the photosensitive drum 23 is then scanned in the sub direction in the direction of the arrow A. The entire photosensitive member is exposed by the sequential exposures so that a latent image is formed thereon. The rotational amount of the photosensitive drum 23 is converted to an electric signal by an optical-style rotary encoder 84 to be sent to the controller for feedback control. The rotary encoder 84 is provided to rotate together with the photosensitive drum 23. The rotary encoder 84 has a circular plate member having slits formed at predetermined angular spacing, the circular plate member being sandwiched between a projector and a light-receiver. The rotary encoder 84 detects a light beam that has passed through the rotating circular plate member to convert the resultant angular velocity information into a pulsed electrical signal.

Figure 4:
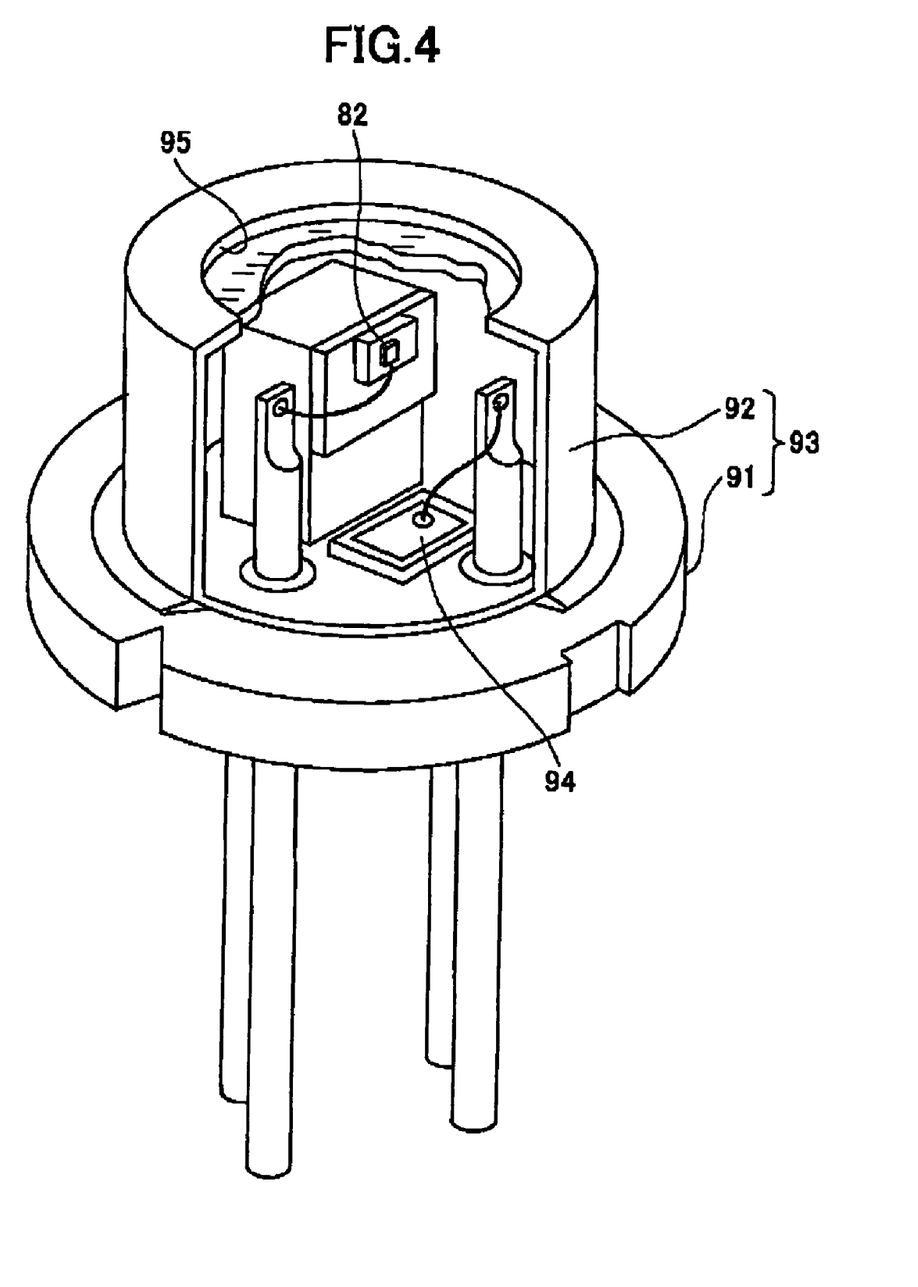
FIG. 4 is a perspective view showing the laser diode.

A partially cutaway perspective view of the laser diode used in the light-emitting unit 80 is shown in FIG. 4. The laser beam LB is emitted upward in FIG. 4. The light-emitting unit 80 includes a laser diode (LD) 82 and a PIN-type photodiode (PD) 94 in a metal case having a metal stem 91 and a cap 92. The photodiode 94 is used for the APC. The laser diode 82 is excited by a drive current modulated by an image signal to emit the laser beam LB through an emission hole 95.

(3) Configuration of Optical Beam Controller

The description now turns to the optical beam controller that controls the luminous energy and light-emission timing of the optical beam.

Figure 5:
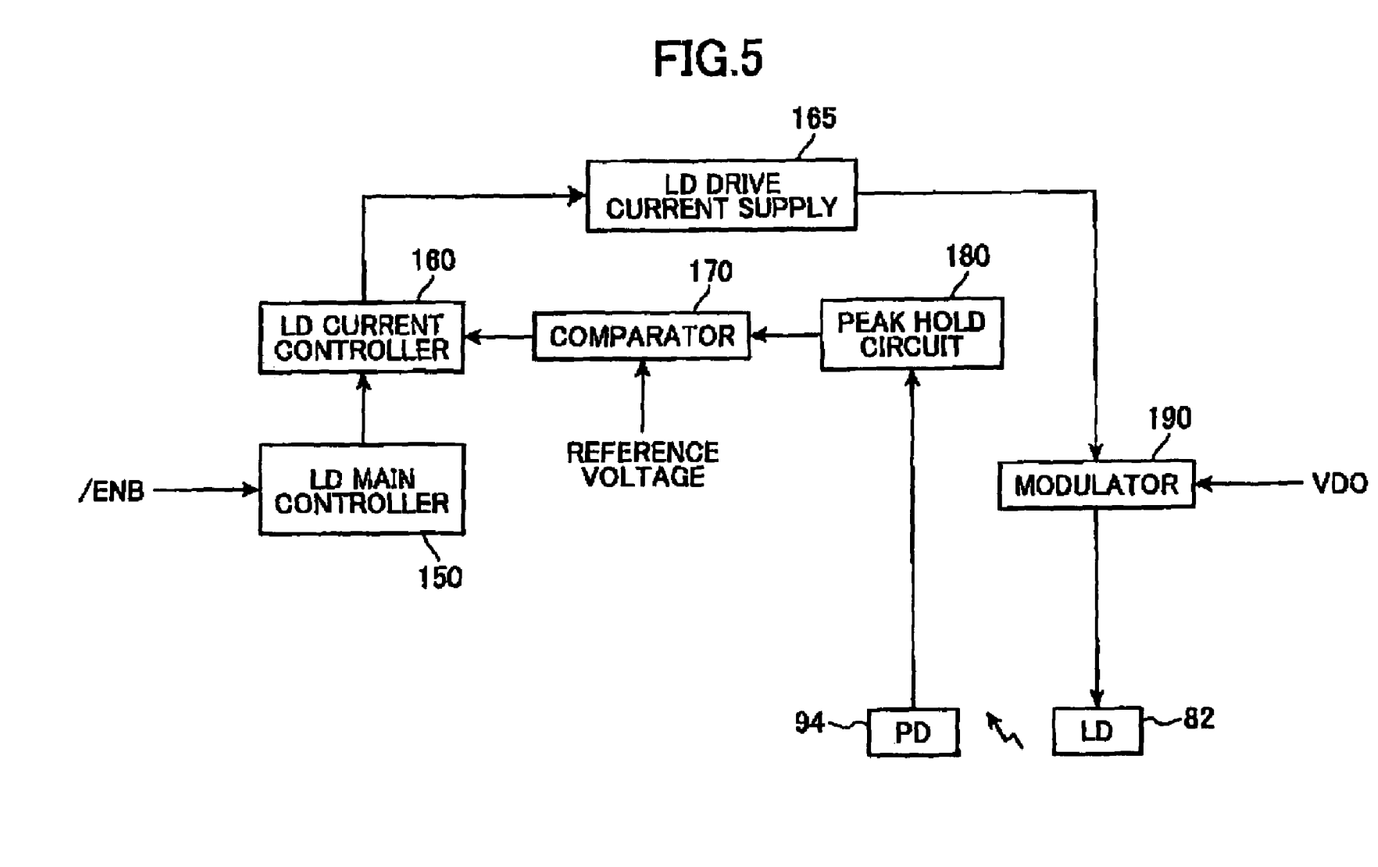
FIG. 5 is a block diagram showing the optical beam controller.

The optical beam controller 140 includes an LD main controller 150, an LD current controller 160, a comparator 170, and a peak hold circuit 180. The LD main controller 150 controls the LD current controller 160 in response to an LD enable signal (/ENB) indicating that the laser diode 82 is to be activated. The LD enable signal (/ENB) is sent from the main controller (not shown) that controls the optical beam controller.

The LD current controller 160 controls an LD drive current supply 165 to generate the drive current activating the laser diode 82. When the enable signal is sent to the LD main controller 150 from the main controller, the LD main controller 150 causes the LD current controller 160 to start the supply of drive current to the laser diode 82 from an LD drive current supply 165. The LD drive current supply 165 generates the drive current activating the laser diode 82. In this embodiment, the control is performed in order that the drive current is increased gradually from the activation of the laser diode 82 at least until the BD sensor 81 detects the laser beam LB for the first time. The control for the drive current is based on an output signal from the comparator 170.

The peak hold circuit 180 includes a capacitive component to hold a peak value of the luminous energy of the laser diode 82 that is detected by the PD 94. The comparator 170 receives a voltage representing the peak value of the luminous energy held by the peak hold circuit 180 and a reference voltage increasing gradually from zero to since the activation of the laser diode 82 to a predetermined value corresponding to the target luminous energy of the optical beam. The comparator 170 outputs a signal that indicates the result of comparing the two voltages. The reference voltage is generated from the main controller. The LD current controller 160 controls the drive current to be supplied to the laser diode 82 in response to the output of the comparator 170 to increase the luminous energy of the laser diode 82 gradually from a non-light-emitting state at the activation of the laser diode 82.

Figure 6:
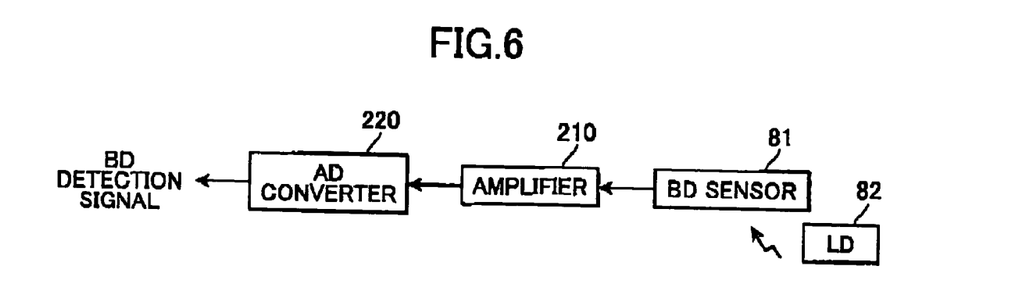
FIG. 6 is a block diagram showing a detection circuit for generating a BD detection signal.
Figure 7:
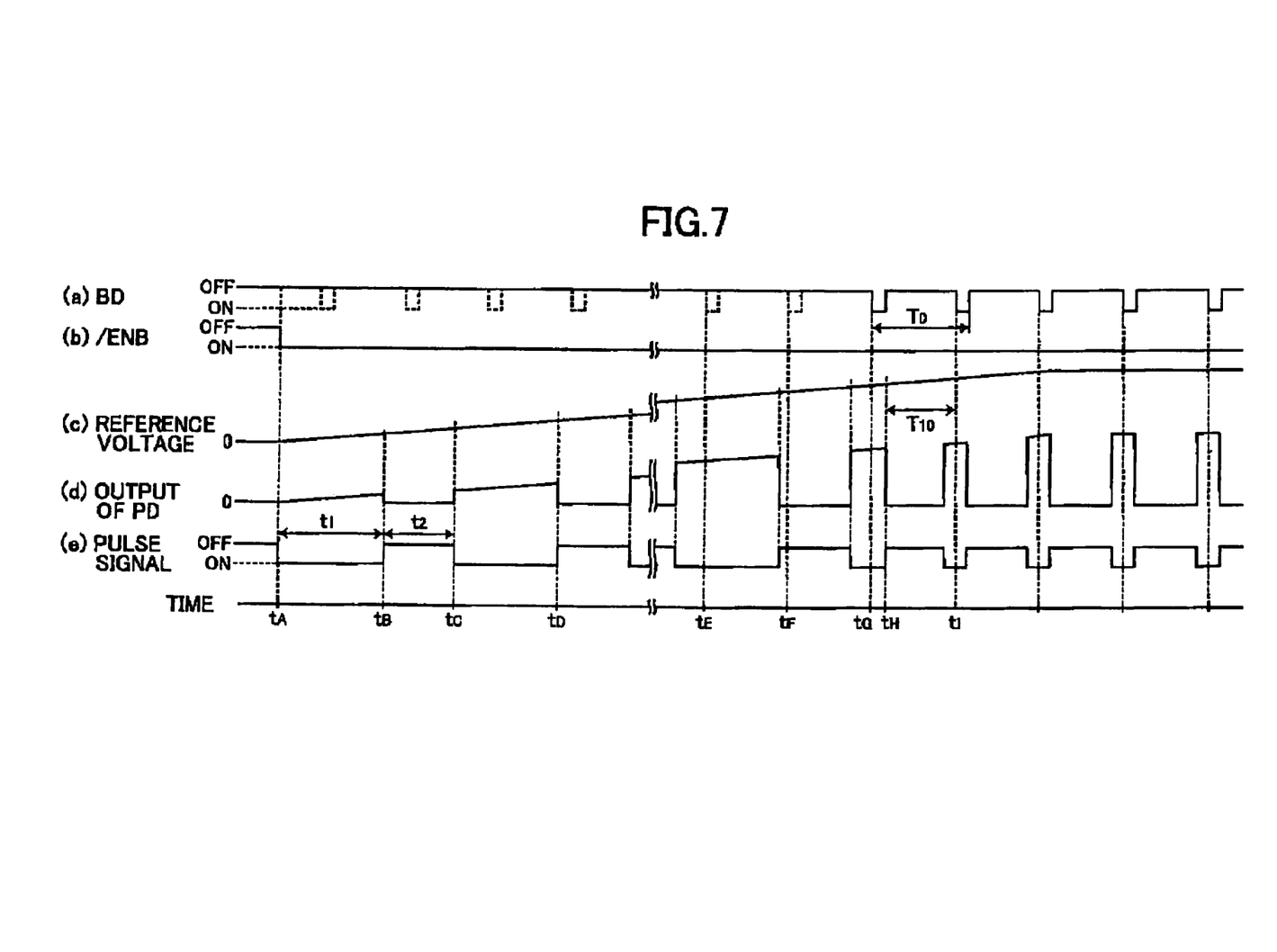
FIG. 7 is waveforms of the signals during an initial period started by the activation of the laser diode.

In this embodiment, the amount of drive current to the laser diode 82 is controlled. Additionally, a modulator 190 controls the light-emission timing of the laser diode 82. The modulator 190 receives the image signal (VDO) that represents the image to be formed during normal image formation. When the laser diode 82 is activated, the modulator 190 receives a pulse signal defining the light-emission timing instead of the image signal (VDO) to modulate the drive current in accordance with the pulse signal, thereby controlling the light-emission timing of the laser diode 82. In this embodiment, the modulator 190 receives the image signal (VDO) from the above-described controller. FIG. 6 shows a detection circuit for obtaining the BD detection signal. The detection circuit is provided with an amplifier circuit 210 and an AD converter 220, and outputs the BD detection signal as a digital signal. FIG. 7 shows a timing chart showing the above-described signals after the activation of the laser diode 82.

Referring to FIG. 7, when the LD enable signal (/ENB) is received by the LD main controller 150 at the time $t_A$, and the LD current controller 160 starts the supply of drive current to the laser diode 62. In this embodiment, the laser diode 82 is controlled to periodically emit and extinguish light by using a pulse signal from the activation of the laser diode 82 to the first detection of the BD detection signal by the sensor 81. The pulse signal is generated based on the image signal. In this embodiment, the time period from the activation of the laser diode 82 to the first detection of the BD detection signal by the sensor 81 is defined as an initial period. The use of a video signal has the advantage of facilitating the setting of the lengths of the light-emission period and the extinction period. In this embodiment, the laser diode 82 emits light (pulse signal on) in a light-emission period $t_1$ shown in FIG. 7, and does not emit light (pulse signal off) in an extinction period $t_2$.

The lengths of the periods $t_1$ and $t_2$ is determined in general based on the considerations discussed below. The light-emission period $t_1$ is preferably shorter from the viewpoint of suppressing deterioration of the laser diode. However, the detection of the BD detection signal would be delayed if $t_1$ is too short. If the detection of the BD detection signal is delayed, the total light-emission periods required to detect the BD signal for the first time will be extended. Therefore, the advantages of suppressing deterioration of the laser diode 82 by the provision of the extinction period will be reduced. That is why it is preferable to detect the BD signal as quickly as possible within the initial period, even if the extinction period is provided.

In this embodiment, the time required for the laser beam LB to do one scan of the surface of the photosensitive member in the main scanning direction as directed by the polygon mirror 20 (specifically, the spacing between two BD detections designated as a scan period, as shown in FIG. 7) is set to be $T_0$, the light-emission period $t_1$ and extinction period $t_2$ satisfy the following relationships: the light-emission period $t_1 > t_0$ and also the extinction period $t_2 < T_0$. If the laser diode is controlled in order to emit light for the longer period $t_1$ than the scan period and extinguish the light for the shorter period $T_0$. Accordingly, if the luminous energy of the laser beam exceeds the value which is detectable by the sensor 81, and the laser diode 82 is in the extinction period when the laser diode 82 faces the sensor 81, the BD detection signal is obtained reliably in the next light-emission period following the above extinction period.

Referring to FIG. 7 again, the relationship between the reference voltage applied to the comparator 170 and an output signal from the PD 94 is shown.

The enable signal (/ENB) is received by the LD main controller 150 at the time $t_A$, and the supply of drive current by the LD current controller 160 starts, as described above. And the reference voltage supplied to the comparator 170 starts increasing gradually from zero toward the value corresponding to the target luminous energy of the laser beam during the light-emission period $t_A$-$t_B$. The drive current supplied to the laser diode 82 gradually increases in synchronism with the increase of the reference voltage, the luminous energy of the laser diode 82 also increases gradually. Thus, the output level of the PD 94 also increases.

After the first light-emission period $t_A$-$t_B$ has elapsed, the pulse signal is turned off at the time $t_B$ and the laser beam is extinguished, so that the output of the PD 94 also drops. However, the output voltage of the PD 94 representing the luminous energy immediately before the extinguishment of the laser beam at the time $t_B$ is held by the peak hold circuit 180. After the extinction period $t_B$-$t_C$ has elapsed, the thus held voltage is compared with the increasing reference voltage during the next light-emission period $t_C$-$t_D$.

The luminous energy of the laser diode 82, in other words, the output voltage of the PD 94, subsequently increases gradually with the rise in the reference voltage. A time $t_E$ is the moment at which the laser beam is directed to the BD sensor (in other words, the laser beam LB deflected by the polygon mirror 20 passes over the BD sensor 81). However, at the time $t_E$ the luminous energy of the laser beam LB is insufficient to generate the BD detection signal, so that the BD detection signal is not generated at the time $t_E$.

At the time $t_F$, the laser beam LB is again directed to the BD sensor 81. However, the laser diode 82 is in the extinction period, though the laser diode 82 is able to emit light which is detectable by the sensor 81. Therefore, the BD detection signal is not generated. However, since the length $t_2$ of the extinction period is shorter than that of the scan period $T_0$, the BD detection signal is generated reliably when the laser beam LB is directed to the BD sensor 81 again after the time $t_F$, that is, the time $t_G$. This is also because the laser diode 82 is able to emit light which is detectable by the sensor 81.

If the BD detection signal is detected, the BD detection signal is transmitted to the main controller (not shown) that generates the pulse signal. The main controller then turns the pulse signal off at a time $t_H$ at which the BD detection signal goes off, without waiting for the expiration of the period $t_1$. Therefore, deterioration of the photosensitive member can be suppressed. After the initial period is over, APC is continued subsequently while the BD detection signal is acquired by causing the laser diode 82 to emit light only in a predetermined period in which the laser beam LB is directed to and in proximity to the BD sensor 81.

As described above, the optical beam control device of this embodiment ensures that deterioration of components such as the emitting portion of the laser diode. And the photosensitive member can be suppressed by providing a period during which the laser beam LB is extinguished in the initial period from the activation of the laser diode until the optical bean is detected by the BD sensor for the first time.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

As described above, the time length of the light-emission period $t_1$, is longer than the scan time period $T_0$ required for the laser beam to scan over photosensitive drum 23 once. On the other hand, the time length of the extinction period $t_2$ is set to be shorter than $T_0$. Therefore, the BD detection signal is obtained reliably after the laser diode emits the laser beam having a detectable amount of luminous energy by the sensor 81. However, the total time length of the light-emission period $t_1$ and the extinction period $t_2$ is not equal to an integral multiple of $T_0$. This is because a starting position of the main scanning direction by the laser beam LB on the photosensitive member is offset for each scan. Accordingly, it ensures to prevent a particular portion on the photosensitive member from deteriorating.

What is claimed is:

1. An optical beam control device comprising:
a light-emission unit that emits an optical beam;
a scanning unit that causes the optical beam to scan on an image bearing member;
a luminous energy detection unit that detects luminous energy of the optical beam emitted by the light-emission unit;
an optical beam detection unit that detects the optical beam to be scanned on a predetermined position on the image bearing member, the optical beam detection unit detecting the optical beam when the optical beam has a luminous energy that is equal to or more than a predetermined amount of luminous energy; and
a control unit that controls a light-emission timing at which the light-emission unit emits the optical beam, the control unit controlling the luminous energy of the optical beam emitted by the light-emission unit in response to the detected luminous energy;

wherein the control unit increases the luminous energy from an energy that is less than the predetermined amount to an energy that is equal to or more than the predetermined amount in an initial period, the initial period starting from an activation of the light-emission unit till a first detection of the optical beam by the optical beam detection unit, the optical beam at the first detection having an energy that is equal to or more than the predetermined amount;

the initial period has an extinction period before the first detection; and the control unit controls the light-emission unit to extinguish the optical beam during the extinction period.

2. The optical beam control device according to claim 1, wherein the initial period has a light-emission period in which the light-emission unit emits the optical beam, the control unit causes the light-emission unit to alternately emit and extinguish the optical beam periodically during the initial period.

3. The optical beam control device according to claim 2, wherein the control unit controls the light-emission unit to periodically repeat the light-emission period and the extinction period during the initial period so that the optical beam detection unit detects the optical beam having the predetermined amount of luminous energy by the end of the initial period.

4. The optical beam control device according to claim 2, wherein the light-emission period has a time length which is longer than a scan time period required for the optical beam to scan on the image bearing member once, the control unit causes the light-emission unit to extinguish the optical beam after the light-emission period.

5. The optical beam control device according to claim 2, wherein a total time length of the light-emission period and the extinction period is different from an integer times of a time length of the scan time period.

6. The optical beam control device according to claim 1, further comprising a current supply unit that supplies a drive current to the light-emission unit, wherein the control unit controls an amount of the drive current to be supplied to the light-emission unit, and the control unit increases the amount of the drive current, thereby increasing the luminous energy of the optical beam emitted by the light-emission unit.

7. An image-forming device comprising:

a light-emission unit that emits an optical beam;

an image bearing member that is exposed by the optical beam to form a latent image thereon;

a scanning unit that causes the optical beam to scan on the image bearing member;

a luminous energy detection unit that detects luminous energy of the optical beam emitted by the light-emission unit;

an optical beam detection unit that detects the optical beam to be scanned on a predetermined position on the image bearing member, the optical beam detection unit detecting the optical beam when the optical beam has a luminous energy that is equal or more than a predetermined amount of luminous energy; and a control unit that controls a light-emission timing at which the light-emission unit emits the optical beam, the control unit controlling the luminous energy of the optical beam emitted by the light-emission unit in response to the detected luminous energy;

wherein the control unit increases the luminous energy from an energy that is less than the predetermined amount to an energy that is equal to or more than the predetermined amount in an initial period, the initial period starting from an activation of the light-emission unit till a first detection of the optical beam by the optical beam detection unit, the optical beam at the first detection having an energy that is equal to or more than the predetermined amount;

the initial period has an extinction period before the first detection; and the control unit controls the light-emission unit to extinguish the optical beam during the extinction period.

8. The image-forming device according to claim 7, wherein the initial period has a light-emission period in which the light-emission unit emits the optical beam, the control unit causes the light-emission unit to alternately emit and extinguish the optical beam periodically during the initial period.

9. The image-forming device according to claim 8, wherein the control unit controls the light-emission unit to periodically repeat the light-emission period and the extinction period during the initial period so that the optical beam detection unit detects the optical beam having the predetermined amount of luminous energy by the end of the initial period.

10. The image-forming device according to claim 8, wherein the light-emission period has a time length which is longer than a scan time period required for the optical beam to scan on the image bearing member once, the control unit causes the light-emission unit to extinguish the optical beam after the light-emission period.

11. The image-forming device according to claim 8, wherein a total time length of the light-emission period and the extinction period is different from an integer times of a time length of the scan time period.

12. The optical beam control device according to claim 7, further comprising a current supply unit that supplies a drive current to the light-emission unit, wherein the control unit controls an amount of the drive current to be supplied to the light-emission unit, and the control unit increases the amount of the drive current, thereby increasing the luminous energy of the optical beam emitted by the light-emission unit.

* * * * *